United States Patent [19]

Peiffer et al.

[11] Patent Number: 5,096,603

[45] Date of Patent: Mar. 17, 1992

[54] THERMALLY STABLE HYDROPHOBICALLY ASSOCIATING RHEOLOGICAL CONTROL ADDITIVES FOR WATER-BASED DRILLING FLUIDS

[75] Inventors: Dennis G. Peiffer, Annandale; Jan Bock, Bridgewater, both of N.J.; Julie Elward-Berry, Houston, Tex.

[73] Assignee: Exxon Research and Engineering Company, Florham Park, N.J.

[21] Appl. No.: 564,204

[22] Filed: Aug. 8, 1990

[51] Int. Cl.$^5$ .................................. C09K 7/00
[52] U.S. Cl. .......................... 507/118; 525/327.5; 525/327.6; 525/326.7; 526/262; 526/271; 507/120; 507/122
[58] Field of Search .............. 252/8.51, 8.513; 525/327.5, 327.6, 326.7; 526/262, 271

[56] References Cited

U.S. PATENT DOCUMENTS

| | | | |
|---|---|---|---|
| 3,952,805 | 4/1976 | Persinski et al. | 166/293 X |
| 4,478,727 | 10/1984 | Turner et al. | 252/8.51 |
| 4,581,147 | 4/1986 | Branch, III | 252/8.51 |
| 4,618,655 | 10/1986 | Dehm et al. | 525/344 |
| 4,626,285 | 12/1986 | Peiffer et al. | 166/293 X |
| 4,644,035 | 2/1987 | Dehm et al. | 525/344 |
| 4,797,450 | 1/1989 | Dehm et al. | 525/326.7 |
| 4,812,244 | 3/1989 | Lawson et al. | 252/8.51 |
| 4,883,125 | 11/1989 | Wilson et al. | 166/291 |
| 4,929,425 | 5/1990 | Hoots et al. | 525/329.7 |

Primary Examiner—Robert L. Stoll
Assistant Examiner—Chhaya Sayala
Attorney, Agent, or Firm—R. E. Nanfeldt; Jay Simon

[57] ABSTRACT

A water soluble polymer which is characterized by the formula:

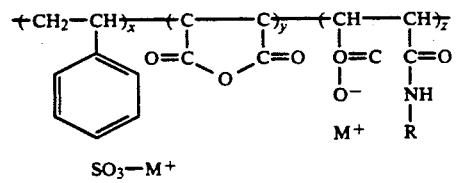

wherein x is 50 mole percent or 66⅔ mole percent or 75 mole percent and y+z is 50 mole percent, when x is 50 mole percent, y+z is 33⅓ mole percent, when x is 66⅔ mole percent, and y+z is 25 mole percent, when x is 75 mole percent, wherein the molar ratio of y to z is about 100:1 to 1:100, and M$^+$ is hydrogen or a metal cation selected from the group consisting of lead, aluminum, iron and Groups IA, IIA, IB and IIB of the Periodic Table of Elements and the level of sulfonation based upon the styrene monomer is about 75 to about 100 mole percent, and R is an alkyl group having about 6 to about 22 carbon atoms.

5 Claims, 3 Drawing Sheets

THERMALLY STABLE HYDROPHOBICALLY ASSOCIATING RHEOLOGICAL CONTROL ADDITIVES FOR WATER-BASED DRILLING FLUIDS

FIELD OF THE INVENTION

The present invention details the synthesis, rheology, drilling fluid properties of a novel low molecular weight, water soluble terpolymer containing nonionic, sulfonate (ionic), and hydrophobic (imide-type) functionalities chemically attached to the polymer chain backbone. The initial starting copolymer is composed of alternating styrene and maleic anhydride units. Molecular weight is typically less than about 10,000 g/mole. This material can be formed via conventional free radical polymerization procedures. This copolymer can subsequently be fully sulfonated via well-known procedures. This procedure is able to fully sulfonate the styrene units leaving the maleic anhydride moieties capable of further reactions. Subsequently, the maleic anhydride moieties are used for incorporation of hydrophobic functionalities onto the chain backbone. These terpolymers are found to be very effective deflocculants in conventional water based drilling fluids. The hydrophobic-associating groups are alkyl-type functionalities. Typical, but non-limiting examples of preferred alkyl groups are hexyl, octyl, decyl, dodecyl and steryl groups. Included also are straight chained or branched alkyl or cycloalkyl groups containing preferably 6–22 carbon units in length, more preferably 6 to 20 and most preferably 6 to 18. The alkyl-type functionality is chemically attached to the polymer via imidization-type chemistry.

BACKGROUND OF THE INVENTION

Oil-based drilling muds have received considerably attention and enjoyed increasing utilization for drilling oil and gas wells because these fluids possess stable rheological and filtration properties at elevated temperatures. The oil-based fluid enhances borehole stability, corrosion control, and lubricity. The so-called relaxed filtration muds allows drilling to occur at a relatively rapid rate with these fluids (particularly in shale type formation). In addition, the introduction of low-aromatic mineral seal oils as a replacement for the more conventional diesel oils has also reduced the environmental concerns associated with accidental spills.

Wider use of oil-based fluids, however, is being reduced by certain factors which include, among other factors, the various environmental restraints placed on them. In offshore and inland waters, oil muds may be used but can not be discharged into the water regardless of the oil type used in the operation. Cuttings may be discharged provided they have been thoroughly cleaned of oil; however, cuttings-wash techniques are expensive; sometimes ineffective and can lead to expensive seabed cleanup operations.

Perricone, et. al. have extensively reviewed the subject of high temperature filtration control additives (SPE Drilling Engineering, 358, October, 1986).

It has been found that oil muds should be avoided in areas prone to lost-circulation problems if the mud density must be maintained near the fracture pressure of the exposed formation. In directional holes larger than 12 in. (30 cm) in diameter in which a fast penetration rate is expected, he recommends not using the oil mud if other options exist.

The industry must have available other fluids systems if it is to drill the deep, expensive wells of the future. No one product is necessarily the answer to improved fluids. A total-systems concept consisting of several products must be integrated to meet the changing demands on the fluid during the course of drilling the well. These systems will require a series of new materials, each with a particular function, to be used when needed.

Researchers have looked continuously at improving the thermal stability of water-based muds. In 1973, U.S. Pat. No. 3,764,530 was granted which discloses the application of a low-molecular-weight sodium polyacrylate for stabilizing the rheology of aqueous muds at elevated temperatures. Earlier that year, Perricone and Young were granted U.S. Pat. No. 3,730,900 covering the use of a sulfonated styrene/maleic anhydride copolymer for stabilizing the rheology of water-based muds at high temperatures. The primary advantage of the latter copolymer was its increased resistance to cement and calcium ion contaminations.

Improved mechanical equipment and greater emphasis on solids removal have contributed to better fluid systems. A reduction in the quantity of bentonite added to a system has aided in the control of high-temperature flow properties.

Filtration control of water-based systems, particularly above 300° F. (149° C.), has received the attention of many investigators who attempted to develop new products to improve control of this property. The natural polymers commonly used as filtration-control agents are not effective at the higher bottomhole temperatures (BHT's). The starches and cellulose derivatives are thermally degraded by oxidation and hydrolysis reaction, producing lower-molecular-weight by-products that cause a substantial loss of viscosity and filtration-control effectiveness. The rate of degradation depends on the fluid, dissolved oxygen, pH of the mud system, and time of exposure to elevated temperature. It has been taught that starches not be used routinely above 225° F. (107° C.) nor carboxymethylcellulose-based products above 300° C. (149° C.).

Lignitic products are used for filtration control in high density water-based muds. Upon neutralization with caustic soda, lignite produces a water-soluble salt with some remaining caustic-insoluble residue. This sodium salt is quite sensitive to electrolytes and can form insoluble calcium carboxylate products in the presence of soluble calcium compounds. Improved resistance to electrolytes can be obtained by the use of higher mud alkalinities or sulfonation of the lignite. In 1976, a combination dispersing filtration-control agent containing a sulfonated lignite and a phenol-formaldehyde resin in U.S. Pat. No. 3,950,140. This product was reported to be superior in performance and less sensitive to calcium and other electrolytes. Although lignite is recognized as more resistant, thermal degradation of lignite does occur, producing intermediate acid compounds and ultimately aliphatic and aryl carboxylic acids.

Treatment level for such lignite products may vary from 1 to more than 20 lbm/bbl (2.85 to 57 kg/m$^3$). Over treatment may lead to increase in viscosity and rate of gelation of the mud, which can be controlled only by dilution with water.

The importance of and need for improved filtration-control polymers is indicated by the number of U.S.

Pat. Nos. (3,025,234; 2,775,557; 3,072,596; and 4,357,245) granted over the years in an effort to produce improved products for drilling muds. Derivatives of hydrolyzed polyacrylamide and acrylic acid are essentially the only polymers to be used commercially in drilling muds for filtration control. Because these polymers lack tolerance toward electrolyte contamination, they have limited application.

Various criteria have also been noted by Perricone, et. al. on the specific characteristics required in the preparation of an effective, thermally stable deflocculant. The following list details some of these desirable characteristics:

1. The polymer should be water-soluble and anionic.
2. It should be thermally stable and resistant to alkaline hydrolysis.
3. It should be an effective filtration-control additive in the presence of electrolytes.
4. Its' molecular weight should be sufficient to control filtration but not so high as to effect the rheology of the system drastically or to be susceptible to shear degradation.
5. It must be cost-effective.
6. It should be easily handled and stored at the rig site.
7. It should be environmentally acceptable.

Perricone et. al. have detailed the properties of two synthetic high molecular weight vinyl sulfonate copolymers and their utilization in controlling high temperature filtration properties in water-based drilling muds. These copolymers are more effective at high temperatures because they do not depolymerize in oxidative or hydrolytic conditions. These materials do not form insoluble salts with the addition of soluble electrolytes.

It should be noted in this regard that the use of hydrophobic groups on water soluble polymers to enhance the rheological properties of water based fluids has been described. One approach to provide polyacrylamide based systems containing hydrophobic groups is described by Bock, et. al., U.S. Pat. No. 4,520,182 and 4,528,348. Water soluble acrylamide copolymers containing a small amount of oil soluble or hydrophobic alkylacrylamide groups were found to impart efficient viscosification to aqueous fluids. Landoll, U.S. Pat. No. 4,304,902, describes copolymers of ethylene oxide with long chain epoxides which also required relatively large polymer concentration (approximately 1%) for thickening water and required surfactant for solubility due to irregularities in the polymerization. In a related case, U.S. Pat. No. 4,428,277, modified nonionic cellulose ether polymers are described. Although these polymers do not contain hydrophobic groups, the viscosification efficiency is very low, requiring 2 to 3 weight percent polymer to provide an enhancement. The use of surfactants to enable solubility and, in turn, viscosification, by a water soluble polymer containing hydrophobic groups is described by Evani, U.S. Pat. No. 4,432,881. The hydrophobic groups claimed are attached to the polymer via an acrylate linkage which is known to have poor hydrolytic stability. In addition, the need for a surfactant to achieve solubility and thickening efficiency should make such a system very salt sensitive, as well as very sensitive to small changes in surfactant and polymer concentrations. Emmons, et. al., U.S. Pat. No. 4,395,524, teaches acrylamide copolymers as thickeners for aqueous systems. While these polymers possess hydrophobic groups they are known chain transfer agents. The resulting polymers have rather low molecular weights and, thus, relatively high polymer concentrations are required to achieve reasonable viscosification of water based fluids.

SUMMARY OF THE INVENTION

The present invention relates to the synthesis of a family of water soluble polymers which when dissolved into a water based drilling fluid impart improved deflocculation characteristics to the said mud. Typically, the deflocculents are relatively low molecular weight polymers composed of styrene sulfonate (sodium salt) monomer, maleic anhydride (either as the anhydride and/or the diacid) and alkyl amine (hydrophobically-associating) functionalized maleic anhydride. Typically, but not limiting, the molar ratio of styrene sulfonate units to total maleic anhydride units is 3:1, 2:1 or 1:1. The level of alkyl functionization of the maleic anhydride units is about 0.1 to about 100 mole%, more preferably about 10 to about 100 mole%, and most preferably 75 to 100 mole%. It should be noted that the molar ratio of sulfonate to alkyl units are not necessarily equivalent, since the defloculation properties of these water soluble polymers can be controlled via changes in the said ratio.

The present invention relates to a water soluble terpolymer for use in drilling fluids, wherein the water soluble polymer is characterized by the formula:

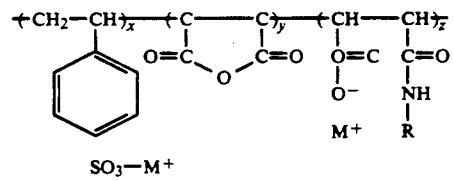

wherein x is 50 mole percent or 66⅔ mole percent or 75 mole percent and y+z is 50 mole percent, when x is 50 mole percent, y+z is 33⅓ mole percent, when x is 66⅔ mole percent, and y+z is 25 mole percent, when x is 75 mole percent, wherein the molar ratio of y to z is about 100:1 to 1:100, more preferably, about 2:1 to 1:2 and most preferably about 1.1:1.0 to 1.0:1.1 and M+ is hydrogen or a metal cation selected from the group consisting of lead, aluminum, iron and Groups IA, IIA, IB and IIB of the Periodic Table of Elements and the level of sulfonation based upon the styrene monomer is about 75 to about 100 mole percent, more preferably about 80 to about 99.9 mole percent, and most preferably about 85 to about 99 mole percent and R is an alkyl group having about 6 to about 22 carbon atoms, more preferably about 6 to about 20 carbon atoms, and most preferably about 6 to about 18.

GENERAL DESCRIPTION

Figure 1:
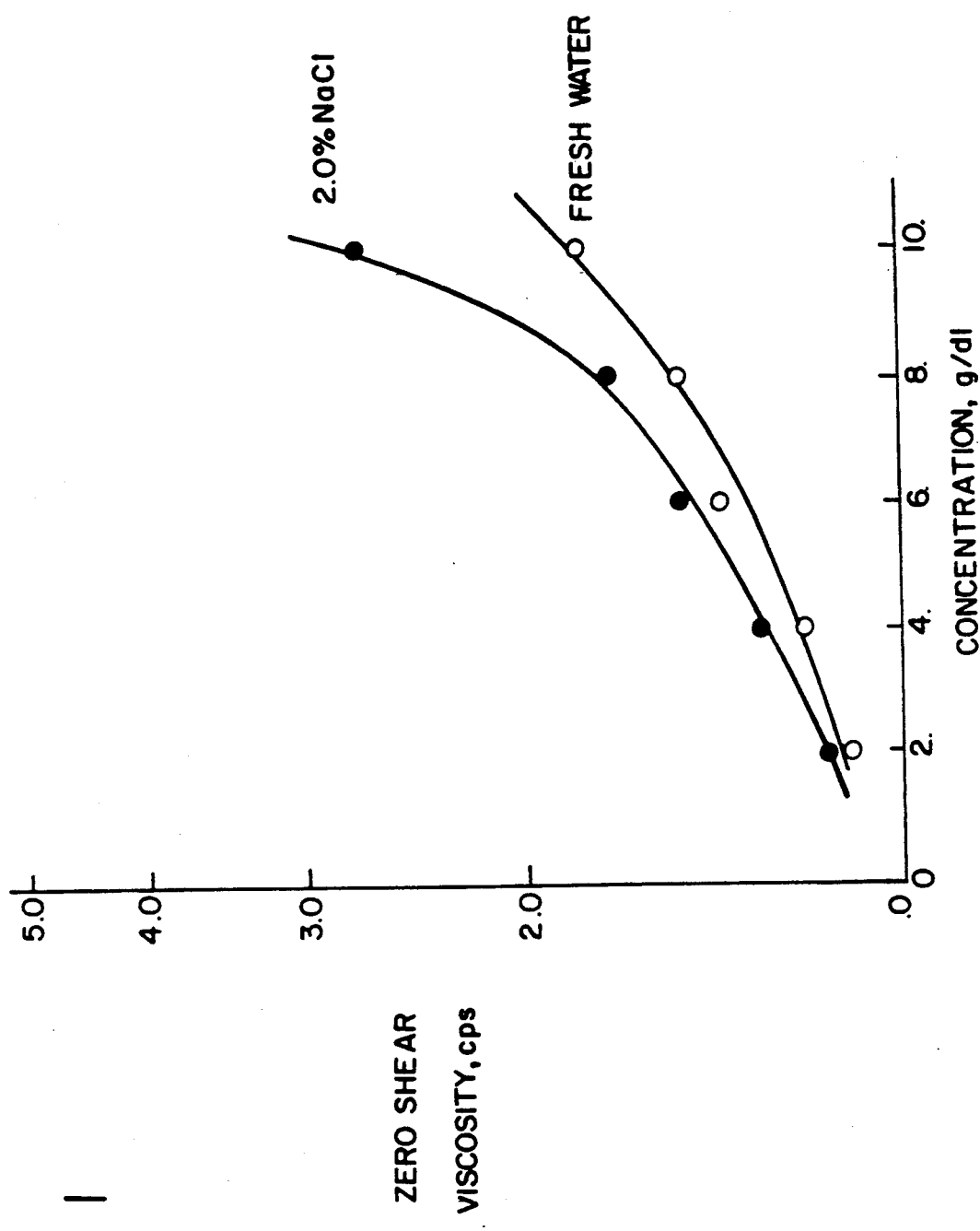
FIG. 1 illustrates zero shear viscosity versus polymer concentration of the hydrophobically-associating terpolymer in fresh and salt water environment.

The present invention describes a new class of viscosification agents for water-based drilling muds which are used during operation of gas and oil wells, wherein these viscosification agents are terpolymers of sodium styrene sulfonate/maleic anhydride/alkyl amine functionaled maleic anhydride. The water-based drilling muds of the instant invention minimally comprise, but can also include other additives; an organic liquid such as an oil, fresh water or salt water, an emulsifier, a wetting agent, a weighting material and the sulfonated terpolymer. In general, the water-based drilling mud has a specific gravity of about 7 pounds per gallon to about 20 pounds per gallon, more preferably about 12 to about 16. A typical water-based drilling mud, as envisioned by the instant invention, comprises about 5 to about 15 lb/bbl of a prehydrated gel, 1 to about 30 lb/bbl of filtration control additives and weighting material (barium sulfate or barite) necessary to give the desired mud density; 5 to about 20 lb/bbl. of seasalt, 2 to about 100 lb/bbl of stimulated drilling solids and caustic to adjust pH as desired.

Typical, but non-limiting examples of suitable emulsifiers which can be readily employed are magnesium or calcium soaps of fatty acids.

Typical, but non-limiting examples of a suitable wetting agent which can be readily employed is an alkyl-aryl sulfonate.

Typical, but non-limiting examples of a weighting material which can be readily employed is barite or a barium sulfate which may optionally be surface-treated with other cations, such as calcium.

The instant invention describes a new class of water soluble polymers which impart improved deflocculation characteristics to water based drilling fluids. Typically, these polymers are formed by a free radical copolymerization process in a polar solvent system containing styrene and maleic anhydride monomers. The resultant copolymer contains styrene and maleic anhydride monomer units typically in a molar ratio of 3:1, 2:1, or 1:1 depending on the initial polymerization conditions. Subsequently, these copolymers are sulfonated in order to form metal neutralized styrene sulfonate-maleic anhydride copolymers. The level of sulfonation (based on styrene monomer content) is about 75 to 100 mole percent, more preferably about 85 to 100 mole percent, and most preferably 90 to 100 mole percent. The counterion of the sulfonate group is an amine or a metal cation selected from the group consisting of aluminum, iron, lead, Groups IA, IIA, IB and IIB of the Periodic Table of Elements.

Subsequently, these sulfonate containing polymers are further functionalized in order to incorporate hydrophobically-associating groups into the polymer chain structure. These hydrophobic groups tend to associate with one another in an aqueous solution and when the associations occur intermolecularly, the solution viscosity and/or its interaction with solid/liquid/gas interfaces may be enhanced relative to the polymer without the hydrophobic groups. The level of hydrophobic functionalization (based on maleic anhydride content) is about 0.1 to about 100 mole percent, more preferably 10 to about 100 mole percent, and most preferably 75 to about 100 mole percent. These are attached to the chain via well-known imidization-type chemistry.

The molecular weight, as derived from intrinsic viscosities, for the starting copolymers of styrene maleic anhydride is about $1 \times 10^2$ to about $1 \times 10^5$, more preferably about $1 \times 10^2$ to about $2 \times 10^4$, and most preferably about $1 \times 10^3$ to about $1 \times 10^4$. The means for determining the molecular weights of the water soluble copolymers from the viscosity of solutions of the copolymers comprises the initial isolation of the copolymers, purification and redissolving the copolymers in a solvent to give solutions with known concentrations. The flow times of the solutions and the pure solvent were measured in a standard Ubbelholde viscometer. Subsequently, the reduced viscosity is calculated through standard methods utilizing these values. Extrapolation to zero polymer concentration leads to the intrinsic viscosity of the polymer solution. The intrinsic viscosity is directly related to the molecular weight through the well known Mark-Houwink relationship. Gel permeation chromatograpy is also able to determine the detailed molecular weight distribution of these polymers.

It should be pointed out that neither the mode of polymerization (solution, suspension, bulk or emulsion polymerization technique, and the like), nor the initiation is critical, provided that the method or the products of the initiation step does not inhibit production of the styrene-maleic anhydride polymers or chemically modify the initial molecular structure of reacting monomers.

The sulfonation of styrene monomers units incorporated into the polymer chain structure are well-known to those versed in the state of the art. Hydrophobically-associating groups, i.e., alkyl-type units, are chemically bonded to the chain via imidization-type chemistry. The preparation of conventional water-based drilling fluids are well-known to those versed in the state of the art.

The present invention relates to a water soluble terpolymer for use in drilling fluids, wherein the water soluble polymer is characterized by the formula:

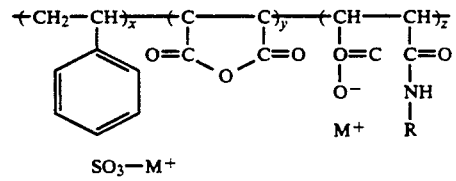

wherein x is 50 mole percent or 66⅔ mole percent or 75 mole percent and y+z is 50 mole percent, when x is 50 mole percent, y+z is 33⅓ mole percent, when x is 66⅔ mole percent, and y+z is 25 mole percent, when x is 75 mole percent, wherein the molar ratio of y to z is about 100:1 to 1:100, more preferably, about 2:1 to 1:2 and most preferably about 1.1:1.0 to 1.0:1.1 and M+ is hydrogen or a metal cation selected from the group consisting of lead, aluminum, iron and Groups IA, IIA, IB and IIB of the Periodic Table of Elements and the level of sulfonation based upon the styrene monomer is about 75 to about 100 mole percent, more preferably about 80 to about 99.9 mole percent, and most preferably about 85 to about 99 mole percent and R is an alkyl group having about 6 to about 22 carbon atoms, more preferably about 6 to about 20 carbon atoms, and most preferably about 6 to about 18.

DESCRIPTION OF THE PREFERRED EMBODIMENTS

The following examples illustrate the present invention without, however, limiting the same hereto.

EXAMPLE 1

The starting water soluble copolymer was functionalized with octylamine (i.e., hydrophobe) in an aqueous environment at an elevated temperature. An example of the detailed synthetic procedure is as follows: Dissolve 40.0 g of the sulfonated styrene-co-maleic anhydride polymer into 80.0 g of distilled water. Add 2.21 g of octylamine while vigorously agitating the mixture for 24 hours. Subsequently adjust pH to 7.0 with sodium hydroxide. This neutralization procedure also hydrolyzes the unreacted anhydride units. The terpolymer is precipitated in a large excess of acetone and dried in vacuum for 24 hours at 100° C. Nitrogen analysis was used to determined hydrophobe content. The result is 0.25 wt.% or 3.3 mole percent hydrophobe.

EXAMPLE 2

The above water soluble, hydrophobically associating polymer was dissolved in fresh water and sodium chloride solutions (FIG. 1). The rheological data clearly shows that the addition of salt does not cause anticipated decrease in viscosity but an increase in performance. This unusual and useful behavior is due to the hydrophobic associations which become stronger in high brine environments.

EXAMPLE 3

This polymer was tested as a deflocculent in a standard high temperature drilling fluid. The composition of the fluid is described below (Table I):

TABLE I

| Standard High-Temperature Fluid Composition |
| --- |
| 12#/bbl prehydrated gel |
| 10.5#/bbl seasalt |
| Deflocculent, as indicated |
| 60#/bbl RevDust (simulated drill solids) |
| 20.5#/bbl Filtrex (filtration control material) |
| 2#/bbl KemSeal (filtration control polymer) |
| 250#/bbl Barite (for 13 ppg density) |
| pH adjusted continuously to 10.0 with caustic, as needed |

Note:
/bbl is approximated in the laboratory as gm/350 cc.

The challenge for any temperature-stable water-based drilling fluid is to maintain controlled viscosity as the temperature increases. Clay-based fluids traditionally undergo large viscosity increases with temperature, and the minimization of this increase is one of the objectives of this invention. The drilling fluid samples were all prepared at a density of 13 ppg (1.56 specific gravity), equilibrated overnight for 16 hours at 150° F., and then subsequently hot-roll-aged overnight for 16 hours at 425° F., prior to testing.

Figure 2:
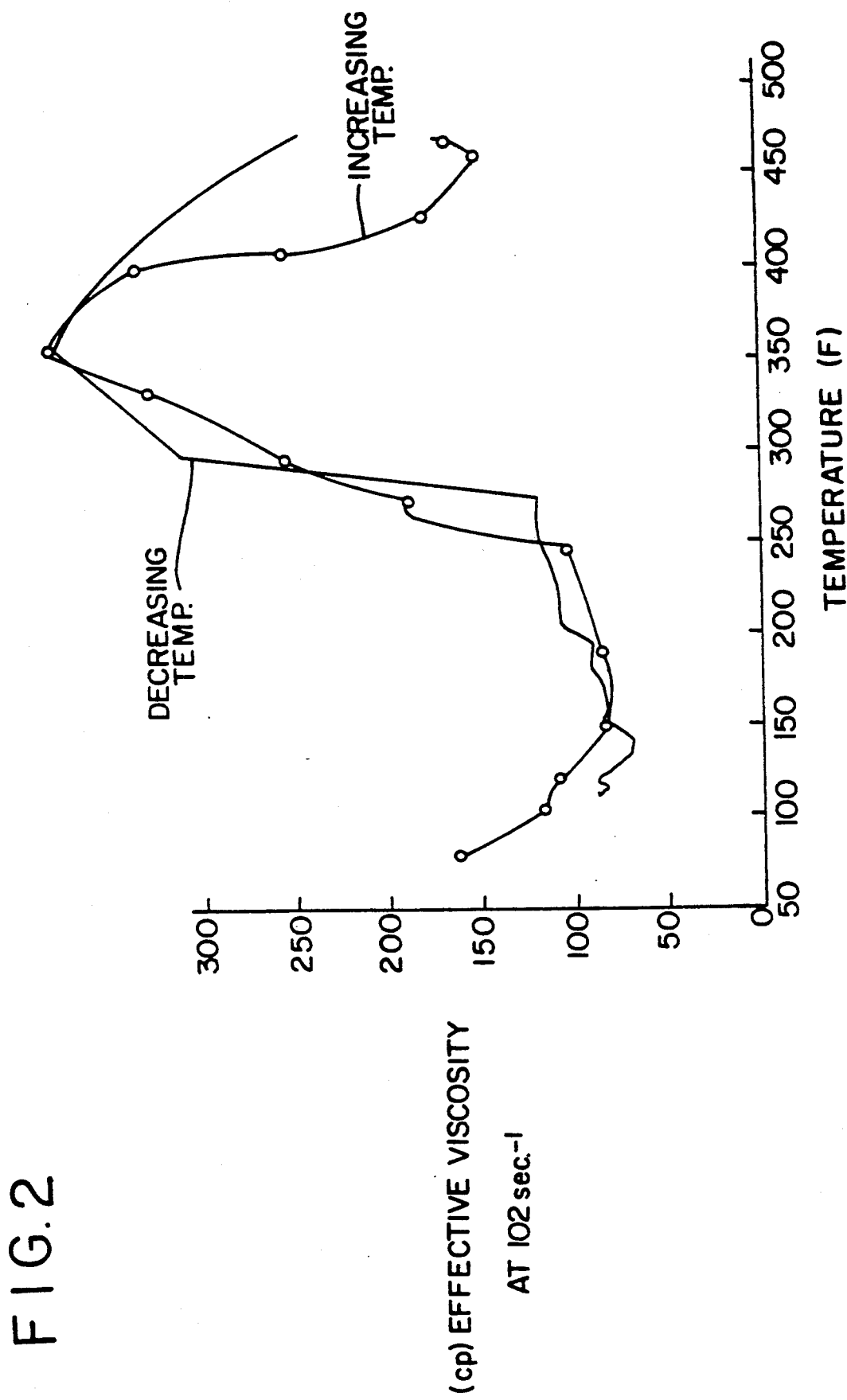
FIG. 2 illustrates viscosity-temperature profiles of a traditional high temperature mud without deflocculant.
Figure 3:
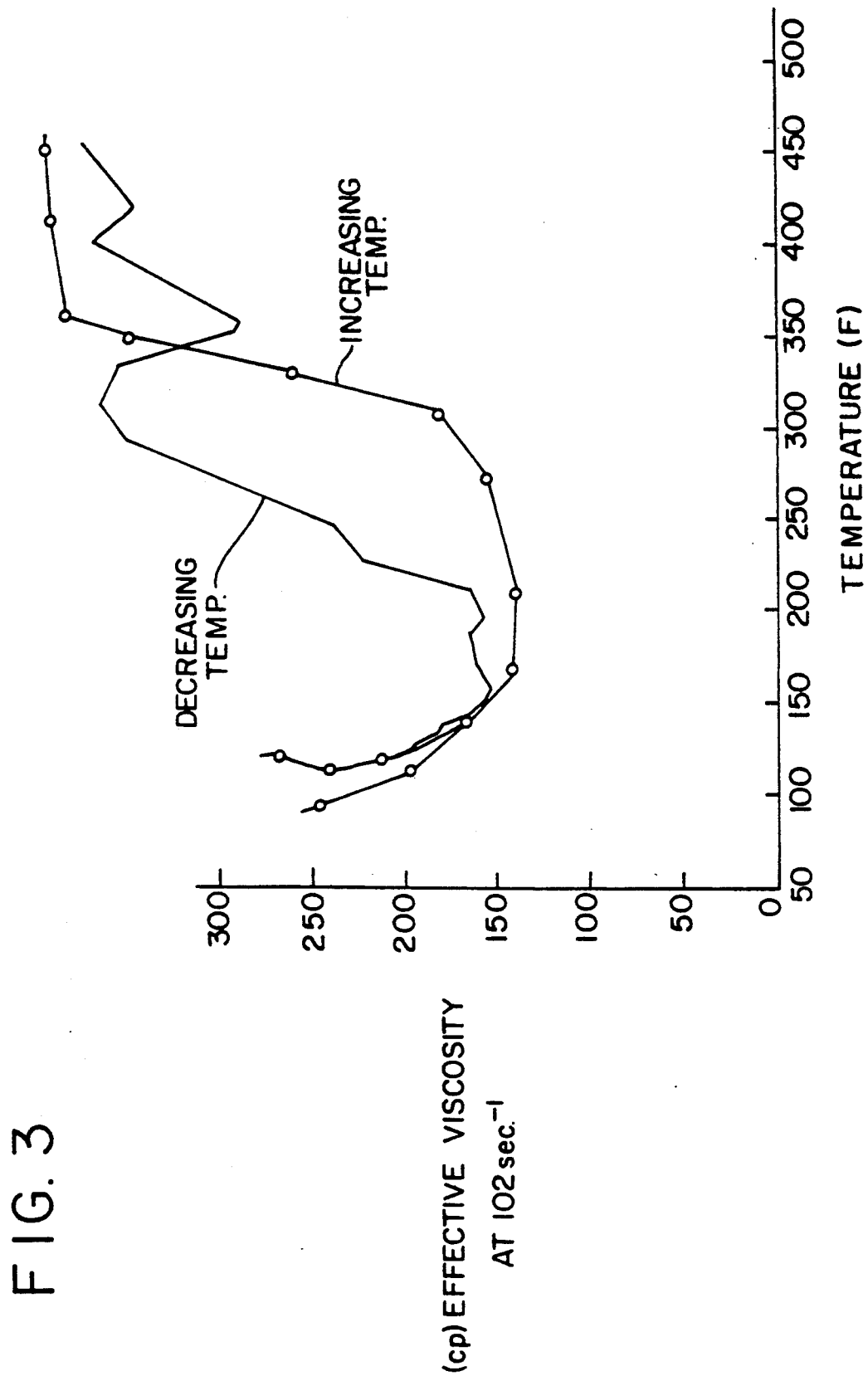
FIG. 3 illustrates viscosity-temperature profile of a traditional high temperature mud with the deflocculant (Example 1) at a concentration of 1 lb/bbl.

The detailed rheological characteristics of the drilling fluid were measured with (FIG. 3) and without (FIG. 2) the above described polymer. A close examination of the data shows that the addition of the defloccuent markedly improves the performance of the fluid over a broad temperature range. This corresponds to a substantial enhancement in the mud performance.

What is claimed is:

1. A water soluble polymer which is characterized by the formula:

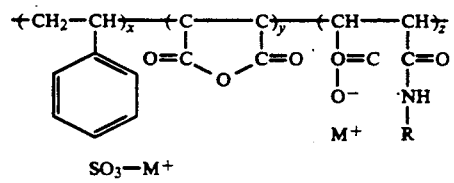

wherein x is 50 mole percent or 66⅔ mole percent or 75 mole percent and y+z is 50 mole percent, when x is 50 mole percent, y+z is 33⅓ mole percent, when x is 66⅔ mole percent, and y+z is 25 mole percent, when x is 75 mole percent, wherein the molar ratio of y to z is about 100:1 to 1:100, and M+ is hydrogen or a metal cation selected from the group consisting of lead, aluminum, iron and Groups IA, IIA, IB and IIB of the Periodic Table of Elements and the level of sulfonation based upon the styrene monomer is about 75 to about 100 mole percent, and R is an alkyl group having about 6 to about 22 carbon atoms.

2. A water soluble terpolymer according to claim 1, wherein x is 50 mole percent and y+z is 50 mole percent.

3. A water soluble terpolymer according to claim 1, wherein R has 8 carbon atoms.

4. A water soluble terpolymer according to claim 1 wherein the molar ratio of Y to Z is about 2:1 to 1:2.

5. A water soluble terpolymer according to claim 4 wherein the molar ratio of Y to Z is about 1.1:1.0 to 1.0:1.1.

* * * * *